Sept. 26, 1939.  R. P. PIPEROUX  2,173,859
MANUFACTURE OF TUBES
Filed July 2, 1937  7 Sheets-Sheet 1

INVENTOR
Rene P. Piperoux
BY
ATTORNEYS

Sept. 26, 1939.  R. P. PIPEROUX  2,173,859
MANUFACTURE OF TUBES
Filed July 2, 1937  7 Sheets-Sheet 4

INVENTOR
Rene P. Piperoux
ATTORNEYS

Sept. 26, 1939.   R. P. PIPEROUX   2,173,859
MANUFACTURE OF TUBES
Filed July 2, 1937   7 Sheets-Sheet 6

INVENTOR
Rene P. Piperoux
ATTORNEYS

Patented Sept. 26, 1939

2,173,859

UNITED STATES PATENT OFFICE 2,173,859

MANUFACTURE OF TUBES

Rene P. Piperoux, Radburn, N. J., assignor to Celluloid Corporation, a corporation of New Jersey Application July 2, 1937, Serial No. 151,570

20 Claims. (Cl. 93—82)

This invention relates to a mechanism adapted to produce tubes of any desired length, diameter or shape from film, foil or sheet material such as any film, foil or sheet formed of or containing a derivative of cellulose or similar material.

An object of this invention is the production of a mechanism which will automatically roll or form cylinders from substantially continuous lengths of sheet material and cut the cylinders into desired lengths. Another object of the invention is the production of a tube forming mechanism that may be adjusted to form any desired length tube. Still another object of the invention is the production of a tube forming mechanism that may be adjusted to form any desired size tube. A further object of the invention is the production of an entirely automatic device for forming tubes or cylinders from relatively thin, and flimsy sheet material. Another object of the invention is the production of a tube forming mechanism that may be employed to form tubes from transparent films that are easy damaged without marring same. Other objects of the invention will appear from the following detailed description and drawings.

In the drawings, wherein the reference numerals refer to the same or similar elements in the various views.

The mechanism of my invention is constructed to form tubes primarily from films or foils made from or containing cellulose acetate or cellulose nitrate and/or other derivatives of cellulose. These materials are very flexible and are easily defaced by scratches, etc. These materials may be transparent, and in this event scratches on either side of the materials will be readily seen. Films or foils varying in thickness from .001 inch to .08 inch may be employed. The preferred thicknesses are between 0.003 inch to 0.010 inch. In place of the organic derivatives of cellulose material, paper or other highly flexible materials may be employed. Two or more sheets of an organic derivative of cellulose and/or paper, etc., as loose or firmly laminated to each other may be employed. For the purpose of describing this invention, these materials prior to being shaped into a tube will be designated as flat stock. In the specification the terms "tube" and "cylinder" are used interchangeably and these terms are not limited to an article that is circular in cross-section.

A tube-making machine constructed in accordance with this invention, for the purpose of describing the same, may be said to consist primarily of a feeding stage wherein the flat stock is supported in roll form and unwound at a predetermined rate depending upon the settings of adjustments of other parts of the machine. After the flat stock leaves the feeding stage of the machine, it enters the forming stage wherein the flat stock is rolled or bent into a tube or cylinder of the desired diameter and shape and then cemented. An advancing stage is then provided for forwarding the tube thus formed on to the next, or cutting, stage where the substantially continuous tube is cut into the desired lengths. In the last stage the machine positively ejects the cut off tube. The machine operates in a strictly automatic manner from the unwinding of the flat stock to the ejecting of the finished tube. The device is so constructed that it produces tubes having a length variation of less than plus or minus 1/64 inch.

For the purpose of facilitating the description of the mechanism and its mode of operation, the machine will be considered as consisting of the five stages referred to above. However, the division is purely arbitrary, and, as will be seen from the following description, the device functions as a unit with the elements of one stage dependent upon the elements of another stage.

Feeding stage

Figure 1:
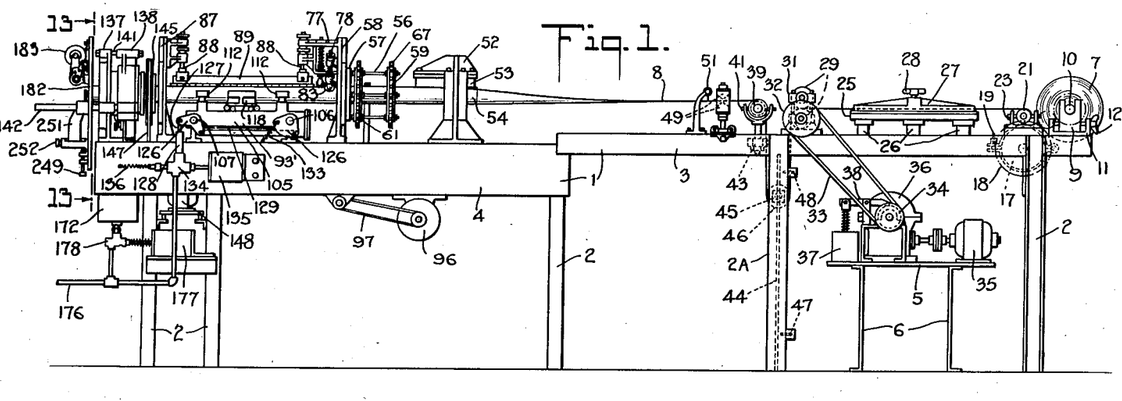
Fig. 1 is a side view of a machine constructed in accordance with this invention.
Figure 2:
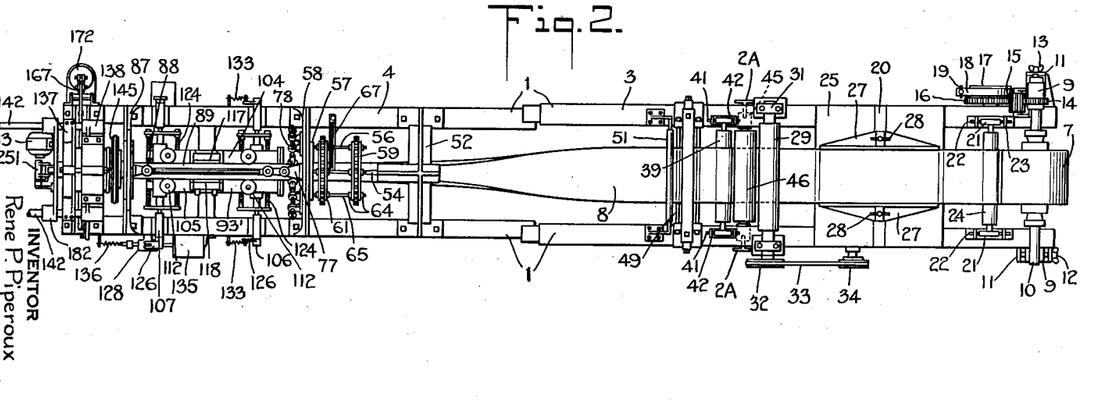
Fig. 2 is a plan view of a machine shown in Fig. 1.

With particular reference to Figs. 1 and 2, the device comprises a suitable frame 1 supported by legs or standards 2. If desired, the frame may consist of two table-like structures 3 and 4 suitably attached to each other. By employing a two section frame the feeding and smoothing device (hereinafter described) may be pulled out of the way to permit the easy insertion and removal of the mandrel (described later). The two-table arrangement also permits of an adjustment of distance between the feeding and rolling stages, which adjustment is necessary to accommodate the different widths and gauges of the sheet stock employed.

An auxiliary support 5 is provided under the table 3 for supporting a mechanism for driving the moving parts of the feeding stage. If desired, the support 5 may be held by the legs 2 of the table 3 or it may be held by a separate set of legs 6. The latter method is preferred for the purpose of preventing vibrations which might effect the length of the finished product or the trueness of the cutting of the cylinders.

A parent roll 7 of flat stock 8 carried by the shaft 10 is mounted upon bearings 9, which bearings are in turn mounted in saddles 11 supported by the table 3. Thumbscrews 12 and 13 are provided to adjust the bearings, and thus the shaft 10, laterally or longitudinally of the table so as to permit the operator to adjust the roll of flat stock in the position desired. In connection with the shaft 10 there are three gears 14, 15 and 16, the function of which is to transmit the rotation of the shaft 10 to a brake drum 17 around which is placed a brake 18 of the band type. A thumb screw 19 is provided for regulating the friction of the brake band 18 on the brake drum 17. The function of the brake and its connecting gears is to provide sufficient friction to prevent the roll 7 from unrolling continuously by its own inertia under a sudden pull on the flat stock. It must be sufficiently loose, however, to permit the flat stock being pulled from the roll.

Mounted in bearings 21, which are adjustable by means of screws 22 operating between saddles 23 and the bearings 21, is a guide roll 24 which is preferably covered with rubber. The function of the adjustable guide roll 24 is to direct the sheet stock 8, in a horizontal plane, longitudinally over the center of the machine.

On the table 3 forward of the guide roll 24 is a vertically adjustable stand 25. The stand 25 is supported by a plurality of legs 26 capable of being lengthened or shortened by any suitable means (not shown). The stand 25 is provided with a guideway 20 in which slide guide shoes of two adjustable jaws 27. The jaws 27 are held in adjusted position by means of screws 28. One function of the stand 25 is to permit the operator to make a joint in the flat stock without stopping the machine when a new roll of flat stock is to be introduced to replace one that has been used up. Another function of the stand is to support the adjustable jaws 27 which cooperate with the guide roll 24 to position the flat stock as it is fed to the tube forming stage of the mechanism. The surface of the stand 25 is preferably slightly below the path taken by the flat stock so that during the operation of the machine the flat stock does not touch the surface of this stand. As the machine is designed primarily for work upon flat stock, transparent or otherwise, formed from a derivative of cellulose, the dragging of the flat stock over supports must be avoided as the material is usually very easily scratched. In this respect the stock and partly formed cylinders are caused to float through the whole machine with contact only at a few spaced points.

A pair of pinch rollers 29 (preferably covered with rubber or similar material) are mounted in suitable bearings 31 supported by the table 3. One or both of the rollers 29 may be driven by means of a pulley 32 attached to the shaft of one of them. The pulley 32 is driven, in most instances intermittently, by a belt or chain 33 which is driven by a pulley 34 connected to any suitable motor 35 through a gear reduction device 36. A clutch is provided for controlling the operation of the pulley 34 by the source of power. This clutch is operated by a solenoid 37 acting through lever 38. The function of the drive and pinch rollers 29 is to provide a constant and minimum tension of the stock forward thereof. Such a tension is necessary to produce tubes of uniform lengths and to impose upon the stock and the stock pulling mechanisms forward thereof a minimum of stress.

A guide roller 39 is adjustably mounted by means of screws 41 in saddles 42 vertically adjustable with respect to the table 3 by means of nuts 43. The table 3 is also provided with legs 2A in which are guideways 44. Sliding guides 45 are adapted to slide in the guideways 44 and support a floating guide roller 46. The flat stock 8 is threaded between the pinch rollers 29 and then under the floating roller 46 and over the guide roller 39. The floating roller 46 may be counterbalanced by any suitable means (not shown) and thus the flat stock entering the tube forming means is under a proper and uniform tension. The counterbalancing means may be an adjustable weight suspended by a cord passing over a pulley and then to the bearings of the floating roller or it may be a lever, spring, or other suitable counterbalancing means.

Near the bottom and top of the guideway 44 are switches 47 and 48, respectively, which are positioned in such a manner that they are operated by contact with one of the sliding guides 45. The function of the floating roller 46 and related parts is to control the tension and rate of feed of the flat stock. When the floating roller reaches the switch 47 the rotation of the pinch rollers 29 is interrupted through a connection between the switch and the solenoid 37 which acts upon the lever 38 disconnecting the clutch placed between the pulley 34 and the speed reducing unit 36. As the flat stock 8 becomes used up the floating roller 46 rises until its guide 45 touches the switch 48 which operates the solenoid 37 again and engages the clutch, thereby rotating the pinch rollers 29 which pull off the flat stock from the parent roll 7 to form a new loop which permits the floating rollers 46 to drop down again until it again contacts switch 47 and so on through a predetermined cycle.

Mounted on the table 3 forward of the guide roller 39 is a pair of members 49. The function of these members is to keep the flat stock in a flat plane up to that point. Beyond that point the flat stock starts to curve into the shape which will finally be given to it by the forming stage of the mechanism. The members 49 may be formed of rubber or similar material or of any suitable material covered with velvet or similar non-scratching material. If desired, a static eliminator 51 may be placed near the members 49 to get rid of any electrical static charge developed on the stock by friction in the parent roll 7 and by passing the same over all the other rollers. A standard "Simco Midget Static Eliminator" may be employed.

*Forming stage*

The forming stage will be described with reference to Figs. 1, 2, 3, 3A, 6, 7, 8, 9 and 12 and with particular reference to Fig. 3. The forming stage of the mechanism is mounted on the table 4 and spaced a sufficient distance from the members 49 to allow the stock to curl to the desired shape. This distance, as stated above, will depend somewhat upon the size of the cross-section of the tube being formed and the gauge of the flat stock employed. Mounted upon the table 4 is a bridge 52 having a depending flange 53 centrally thereof. The flange may be detachable from the bridge. The flange 53 is connected with and forms the support for a mandrel 54 which is slightly smaller in cross section than that of the tube being formed. Mounted upon the mandrel, preferably at spaced points, is a covering of velvet 55 or similar material. The function of the mandrel 54 is to direct the tube through the mechanism and prevent collapse of the same, especially at the parts covered with the velvet. When working heavy stock the velvet may be replaced with satin or by the bare mandrel which is then made larger at the spaced points and these spaced points highly polished. It will be seen the the substantially continuous tube as it is formed and up to the time it is cut into the desired lengths and ejected from the machine, floats through the device supported only at spaced points. Either the mandrel 54 or the bridge 52, or both, are made detachable so that the mandrel may be changed when tubes of different sizes or shapes are desired.

Figures 3, 3A:
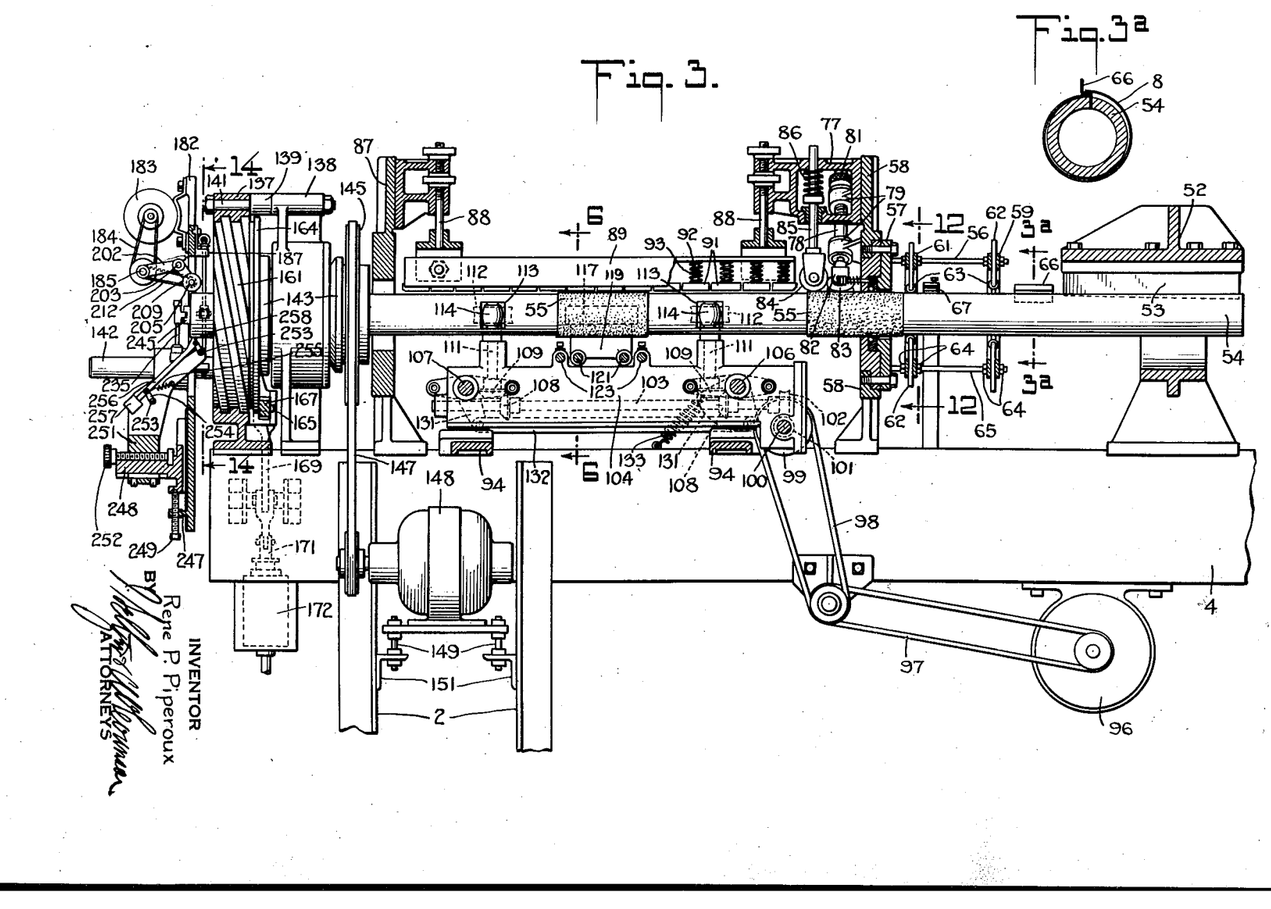
Fig. 3 is a side view, partly in section, of the left hand end of the machine as shown in Fig. 1.
Fig. 3a is a sectional view taken on the line 3a—3a of Fig. 3.
Figure 8:
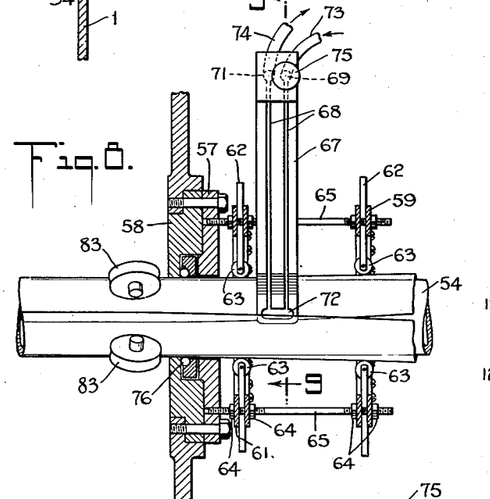
Fig. 8 is a sectional view of the forming section of the machine.
Figure 9:
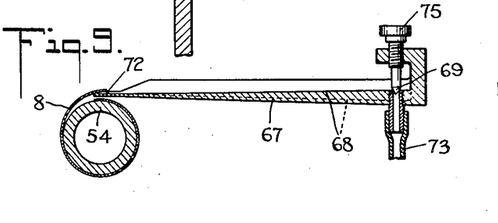
Fig. 9 is a transverse sectional view taken on lines 9—9 of Fig. 8.
Figures 10, 11:
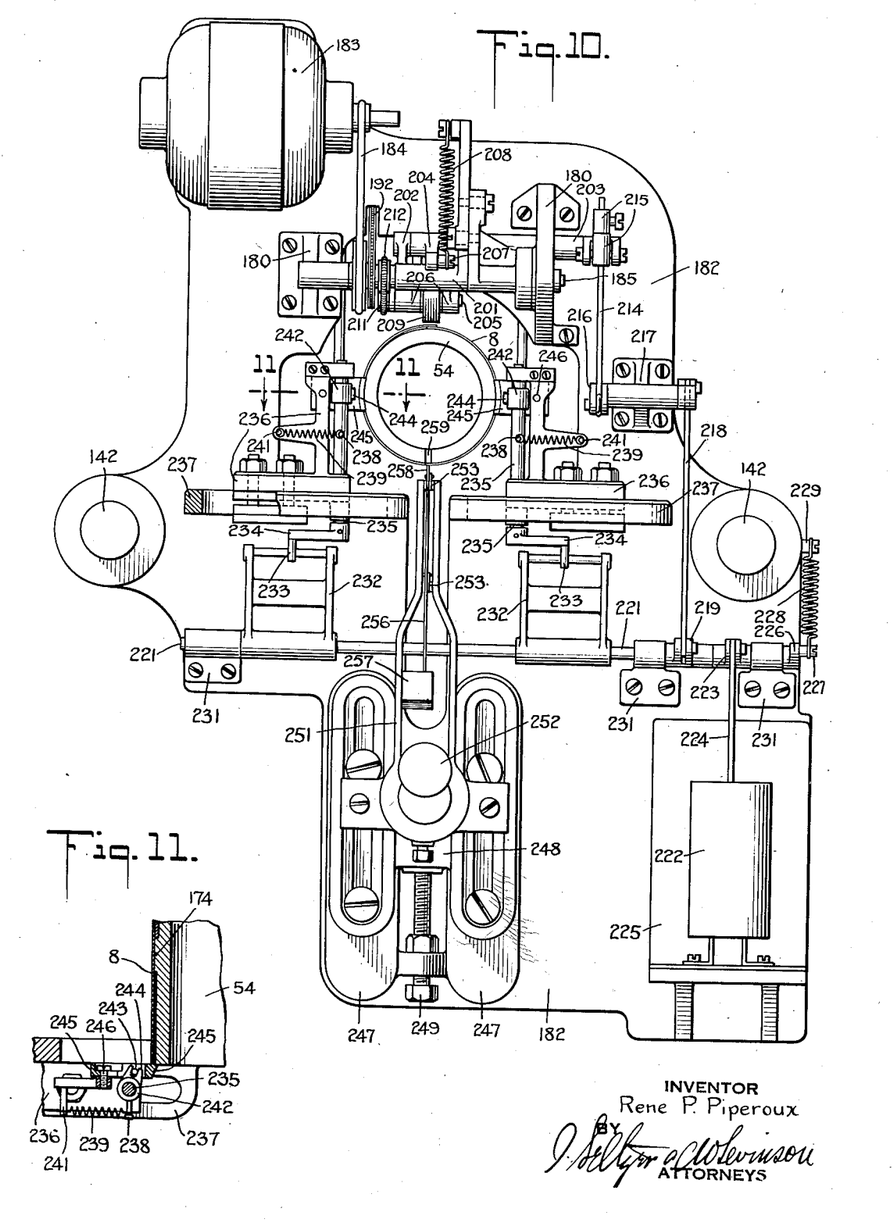
Fig. 10 is an end view from the left hand end of Fig. 4.
Fig. 11 is a sectional view of a detail taken on lines 11—11 of Fig. 10.
Figures 12, 13, 14:
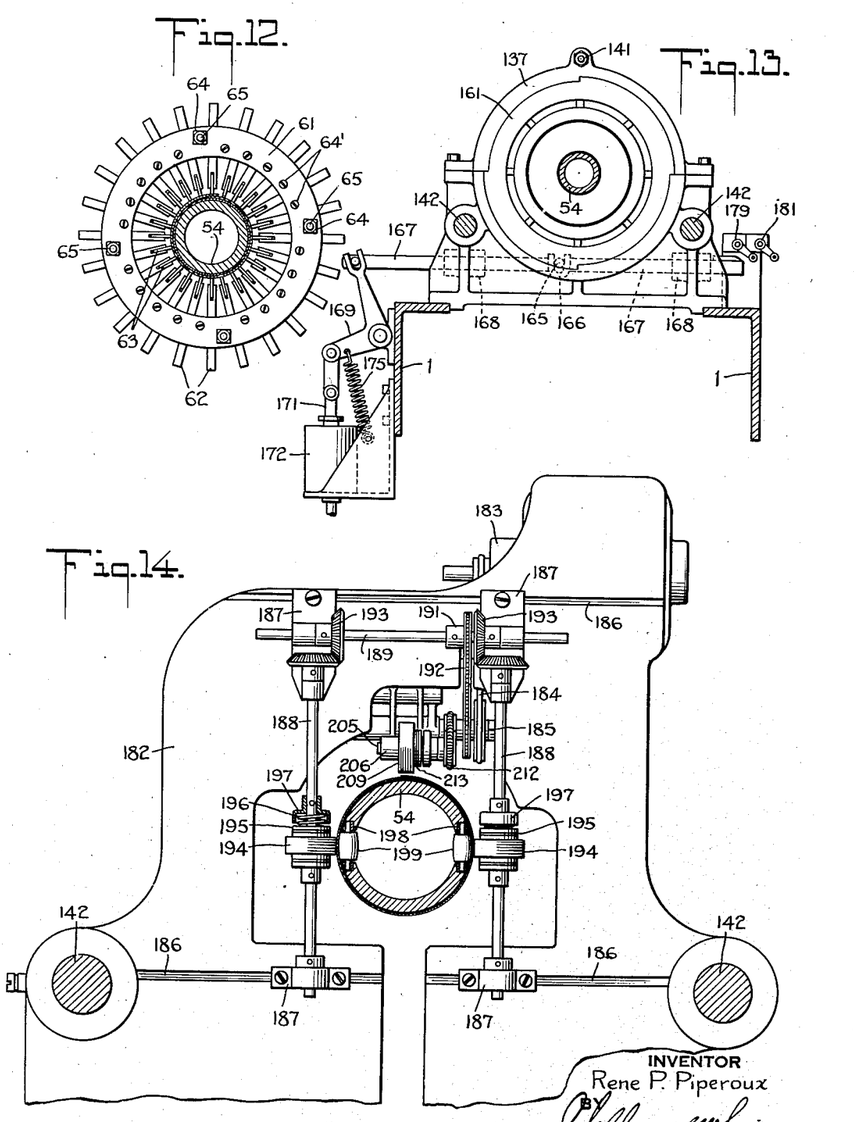
Fig. 12 is a transverse sectional view taken on lines 12—12 of Fig. 3.
Fig. 13 is a transverse sectional view on lines 13—13 of Fig. 1.
Fig. 14 is a transverse sectional view taken on lines 14—14 of Fig. 3.

The shaping of the flat stock into the tube is accomplished with the aid of a shaping device 56 shown in detail in Figs. 3, 8 and 12. The shaping device 56 is supported by a ring 57 that is supported from the table 4 by a hollow bracket 58. The shaping device 56 comprises two rings 59 and 61 spaced from each other and concentrical to the mandrel 54. Each of these rings is split circumferentially and between the halves are mounted bifurcated rods 62 which are adapted to act as bearing members for rollers 63. The rods 62 are held in any desired position by binding the two halves of a ring together by means of screws 64'. As shown, there are twenty-four rods and rollers to each ring but this number may be changed depending upon the diameter of the cylinder and the gauge of the stock. The circumference formed by the rollers in the ring 59 is larger than that of the desired tube, while the circumference formed by the rollers in the ring 61 is substantially the same as that of the desired tube. In other words, the stock, at this point, is formed to size. The ring 59, however, has its rollers forming a circumference slightly larger, but not necessarily of the same shape as that of the finished tube so as to give the funneling effect to the stock. The rings 59 and 61 may be adjusted relative to each other and to their supporting ring by adjustment of the nuts 64 threaded upon studs 65.

As shown in Figs. 3 and 3A, there is attached to the mandrel a lapping guide 66. The function of this guide is to insure that a predetermined edge of the flat stock will overlap the other edge. As seen in Fig. 3A, the piece 66 has the function of forming the seam by having one side of the stock fitting over and one side under its horizontal portion. This guide also assists the cementing element shown in Figs. 3, 8 and 9 in its function. This cementing element comprises a body portion 67 made of suitable metal or other composition having a U-shaped groove 68 having a gradual slope from a valved inlet 69 to an outlet 71 (Fig. 8). The free end of the body portion 67 is relatively thin to facilitate the insertion of the same between the overlapping edges of the tube forming the seam. In this free end is an enlarged cavity 72 adapted to function as a well for the cementing material. A suitable cement is introduced to the groove 68 by a suitable conduit 73 connected to a source of supply (not shown). The excess cementing material is withdrawn through a conduit 74 connected to a suitable reservoir (not shown). The amount of cement passing into the groove may be regulated by a valve 75. The function of the cementing element is to wipe upon the under side of the overlapping edge of the stock a cementing material. By the present means of supplying the cementing material to the groove 68 there is insured a uniform amount and concentration of cementing material at the point of application. By employing the cementing element of the instant invention, cements which would not feed through wicks may be employed. The separation of the two edges of the stock by the free end of body portion 67 is negligible and therefore there is no distortion of the cylinder which is being rolled into its final shape.

A non-abrasive packing 76 may be provided to prevent the stock from rubbing against the bracket 58 and ring 57.

After the cylinder is shaped it is next brought to the desired size and the edges definitely sealed together by a device shown in Figs. 1, 2 and 3. The sizing means comprises a housing 77 which is attached to bracket 58 on the side opposite to that on which ring 57 is fixed. Mounted in the housing and one at either side of the center vertical line thereof are shafts 78 carried in suitable bearings 79 and adjustable lengthwise by means of thumb nuts 81. The end of each shaft 78 terminates in a bearing 82 in which are journalled concave crowding or pulling rollers 83. The function of these rollers 83 is to draw the stock tightly around the mandrel. It is only this point that the external diameter of the mandrel 54 is substantially the same as the internal diameter of the cylinder. In all other places the cylinder fits loosely on the mandrel. Immediately forward of the rollers 83 is a roller 84 adapted to roll down the cemented portion of the cylinder, thus effecting the positive adhesion of the two edges of the stock. The roller 84 is supported by a shaft 85 mounted in the housing 77. An expansible spring 86 is adapted to force the roller 84 into contact with the cemented seam.

The function of the roller 84 is to press against the freshly made seam of the cylinder so that the cement definitely seals it. The function of the rollers 83 is to crowd-in the stock around the mandrel so as to keep it to the diameter determined by the diameter of the mandrel at this point, or the diameter of the velvet covered mandrel at this point. As shown in the drawings, the roller 84 is just forward of the rollers 83. For thick walled tubes this is the better position. However, in forming thinner walled tubes where the stock has no tendency to spring apart the roller 84 may be moved closer to or may even be between the rollers 83.

Mounted on the table 4 and spaced from the bracket 58 is a second bracket 87. In the bracket 87 and in a continuation of housing 77 are mounted, respectively, two vertically adjustable rods 88. The two rods 88 support a channel member 89 in which are mounted a plurality of shoes 91. The shoes 91 are each slidably mounted on a shaft 92 but are each held in a depressed position by an expansible spring 93 carried by the shaft. If desired, the shoes may be heated. The under surface of the shoes may be of polished metal or they may be covered with velvet or similar material. The function of the shoes is to insure the holding together of the two laps of the seam until the cement has permanently set. For work upon thin flat stock the channel member 89 with its shoes 91 are removed as the crowding rollers 83 and pressing roller 84 are sufficient to hold the stock against any tendency to flatten out.

*Advancing stage*

For pulling the flat stock from the feeding stage through the forming stage and then pushing the formed tube on to the cutting stage a mechanism that intermittently moves the tube in timed relation to the cutting stage is employed. This mechanism is shown generally at 93' on Figs. 1 and 2 and in greater detail in Figs. 3, 6 and 7. This mechanism is supported on the table 4 by crosspieces 94 on which rest bearing members 95. The advancing mechanism is operated by a motor 96 which through belts 97 and 98 rotate a pulley mounted on a shaft 100. A variable speed motor is preferred so that the speed of the movement of the material through the device can be changed with conditions.

Figure 6:
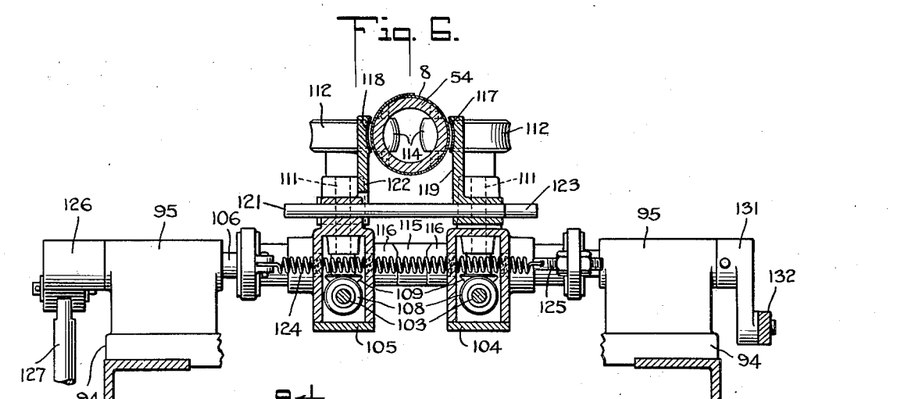
Fig. 6 is a sectional view taken on lines 6—6 of Fig. 3.

The motor 96 through the belts 97 and 98 and the pulley 99 continuously rotates the shaft 100. Mounted on the shaft 100 are a pair of worm gears 101 which mesh with gears 102 mounted upon shafts 103 which are contained in housings 104 and 105 (Fig. 6). The housings 104 and 105 are slidably supported on shafts 106 and 107 journaled in the bearing members 95. On the shafts 103 are beveled gears 108 adapted to mesh with beveled gears 109 mounted on shafts 111, four of such shafts being provided, one at each end of the housings 104 and 105. The shafts 111 are adapted to carry and rotate rollers 112 that are concaved to the shape of the tube at that point. The function of the positively driven rollers 112 is to move the tube forward by frictional engagement with same. To prevent the rollers 112 from pushing the walls of the cylinder against the mandrel, the mandrel is provided with openings 113 at points in register with the rollers 112, in which openings are mounted convex idler rollers 114.

The shafts 106 and 107 are provided with collar type cams 115 adapted to operate against the cam faces 116 which may be integral with the housings 104 and 105 to move the two housings apart, effecting a corresponding movement of the rollers 112 carried by each housing. The moving apart of the housings 104 and 105 thus remove the rollers 112 from contact with the tube, thereby removing the applied force acting to move the tube forward. Even though contact between the rollers 112 and the tube is broken, the cylinder would tend to move forward a small distance due to its inertia. To prevent this there is provided a pair of brakes 117 and 118 which move inward to frictionally stop the tube. The mechanism of these brakes will hereinafter be described. The stock is moved intermittently along the mandrel in timed relation to the cutting stage because the rollers 112 advance the stock only when hugging through the tube the inside mandrel supported rollers 114. There is a period, however, made in response to the cutting stage when the rollers 112 are held away from the stock, and during that period the brakes 117 and 118 hug the mandrel through the tube and stop the advance of the tube almost instantaneously. The brake 117 is attached to a brake shoe 119 which in turn is positively attached to a pair of rods 121 that are connected to the housing 105 while the brake 118 is attached to a brake shoe 122 that is positively attached by a pair of rods 123 to the housing 104. Contractile springs 124, each equipped with a tensioning screw 125, are provided for holding the housings 104 and 105 tightly against the cam 115.

Figure 7:
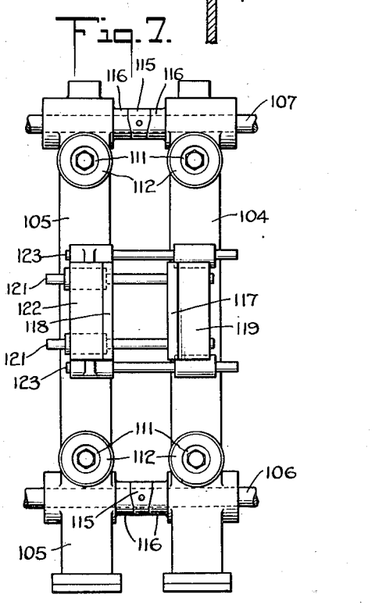
Fig. 7 is a plan view of that part of the device shown in Fig. 6.

From Fig. 7 it will be seen that four concave rollers 112 are mounted upon the housings 104 and 105, which housings slide laterally upon the shafts 106 and 107. The brakes 117 and 118 are also mounted upon the same housings 104 and 105 except that the left hand brake 117 is fixed to the right hand housing 105 and the right hand brake 118 is fixed to the left hand housing 104. The in-and-out movement of the brakes and driving rollers is effected by rotation of the collar type cams 115 which rotate with the shafts 106 and 107. Upon rotation of the cams 115 the housings 104 and 105 are forced apart. This movement disconnects the drive rollers 112 from the tube and brings the brakes 117 and 118 together stopping the movement of the tube. When the shafts 106 and 107 are again rotated to bring the housings toward each other, i. e. into operative position, the spring 124 pulls the housing 104 and 105 together, the brakes are operated, and a contact between the rollers 112 and the tube is effected. To accommodate a tube of a different size all that is necessary is to change the size of the cams 115. This is made more easy by employing two collars on each shaft having one end of each collar provided with a cam face. These collars may then be adjusted to any suitable position on the shaft.

Referring particularly to Figs. 1 and 3, it will be seen that the rotation of the shafts 106 and 107 is effected by means of a bell crank 126 attached to each shaft 106 and 107. One such bell crank, preferably on shaft 107, is connected to the piston 127 of an air cylinder or solenoid 128. The two bell cranks on the shafts 106 and 107 are interconnected by a bar 129 so that the motion imparted by the air cylinder 128 to one bell crank is transmitted to the other, and so to both of the shafts simultaneously. At the opposite side of the machine from the air cylinder 128 the shafts 106 and 107 are provided with bell cranks 131 and connecting bar 132 for effecting a positive unity of operation of the shafts 106 and 107. When the air pressure is relieved in air cylinder 128, the bell cranks and the shafts are brought to the tube moving position by extension springs 133.

The air cylinder 128 which effects the rotation of shafts 106 and 107 may be a single acting cylinder controlled by an air valve 134 which connects the air cylinder 128 to a high pressure air line. This valve is operated by a solenoid 135 which, when energized, forces the valve to such a position as to admit a fluid under pressure to the air cylinder 128. When the solenoid is deenergized the valve returns, under the action of the spring 136, to a position opening the cylinder 128 to the atmosphere.

*Cutting Stage*

Figure 4:
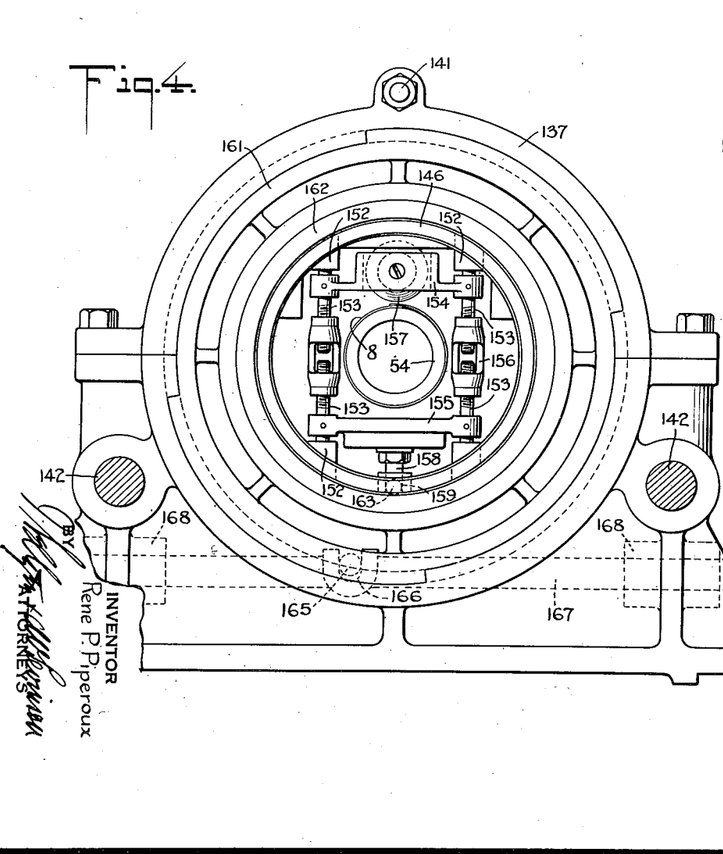
Fig. 4 is a cross-sectional view taken on the line 14—14 of Fig. 3 but in the opposite direction from the arrows marked thereon.
Figure 5:
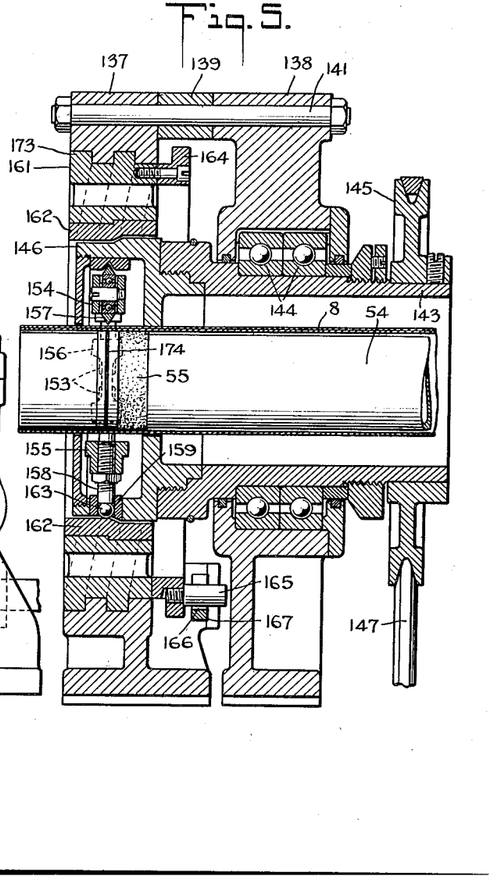
Fig. 5 is a sectional view of that part of the device shown in Fig. 4.

The continuously formed tube or cylinder is driven along the mandrel to a cutting stage where the tube or cylinder is cut into sections of substantially equal and predetermined length. This cutting stage is shown generally in Figs. 1 and 2, an more particularly in Figs. 3, 4 and 5. The cutting element is supported on two frame members 137 and 138 that rest on the table 4. The frame members 137 and 138 are held in spaced relation by means of a spacing collar 139 and tie bolt 141 at the top and stud shafts 142 at the bottom.

A sleeve 143 is rotatably mounted on ball races 144 held by the frame member 138. At one end of the sleeve is a sheave 145, while at the other end there is screwed into the sleeve a removable hub 146. The sleeve 143 is adapted to be continuously rotated by means of a belt 147 connecting it with a motor 148. The motor may be adjustably mounted by means of the bolts 149 on brackets 151 mounted on legs 2 of the table 4. The hub 146 is provided with cylindrical guideways 152 in pairs of which are slidably mounted stirrup rods 153. The stirrup rods 153 are connected together near one end by a cutter holding stirrup 154 and near the other end by a cam follower holding stirrup 155. The distance between the two stirrups may be regulated by turn buckles 156. The stirrup 154 carries a freely rotatable disc cutting wheel 157 while the stirrup 155 has a projecting pin 158 that extends into an opening 159 in the hub 146.

In the frame 137 and around the hub 146 is threaded a coarse square threaded plug 161. This plug 161 is equipped with a hardened sleeve or camway 162. In the opening 159 between the pin 158 and the camway 162 is placed a ball cam follower 163 adapted to ride on the camway 162. At the rear end of the plug 161 is a ring 164 having mounted therein a stud 165. Attached to the stud 165 by means of a trough 166 is a lever 167 adapted for reciprocation in bearings 168 on the frame 137. One end of the lever 167 (Fig. 13) is connected with a bell crank 169 which is connected with a piston 171 of an air cylinder 172. Upon movement of the piston 171 there is effected a rotation of the plug 161 which is thereby moved inwardly or outwardly due to the threads 173 on said plug. As the plug 161 is moved outwardly it allows the cam follower 163 of the cutting element to rotate in the larger circle due to the shape of the camway 162. The stirrups will rotate continuously with the sleeve 143 due to the rods 153 fitting in the guideways 152. The stirrup 155 is made heavier than stirrup 154 so that upon rotation the centrifugal force will hold the pin 158 and ball 163 always tight against the camface 162. As the stirrup 155 is permitted to revolve in a larger circle it pulls the stirrup 154 closer to the mandrel, thus effecting a cutting of the tube. Upon severance of the tube and responsive to the ejecting stage, the lever 167 is again moved, by the spring 175, so that the plug 161 moves inwardly causing the stirrup to travel in a smaller circle and in that way moving the knife away from the mandrel and clear of the advancing portion of the tube.

To insure a complete severance of the tube without unduly dulling the cutting edge the mandrel is provided with a groove 174 in registry with the knife. A strip of velvet 55 is desirable near this point to insure a right angle cutting of the tube by supporting the same concentric with the mandrel.

The air cylinder 172 is connected by suitable pipes to a source of air under pressure such as the line 176 which also is connected to the air cylinder 128 of the advancing stage. The air cylinder 172 is operated in response to a solenoid 177 that operates a valve 178 that either opens the cylinder to the atmosphere or to the air under pressure in the line 176. The lever 167 is adapted to operate two switches 179 and 181 as it is reciprocated back and forth to move the camway or plug 161 in and out to bring the cutter in contact with the tube. As the lever 167 moves to effect a cutting of the tube, it first moves switch 179 which operates a stopping gate in the ejecting stage (to be described later) and then almost immediately moves switch 181 which operates the solenoid 135 that controls the advancing stage advancing rollers 112 and brakes 117 and 118.

*Ejecting stage*

After the advancing tube is cut to length, the segment is ejected from the machine by the means shown generally at the extreme left hand end of Figs. 1 and 2, and more in detail in Figs. 3, 10, 11 and 14. The ejecting mechanism is supported, for the most part, on a frame 182 slidably mounted on the studs 142. The frame 182 is made adjustable so that tubes of different length may be formed by regulating the distance between the frame 182 and the cutter 157. Upon the frame 182 is mounted a motor 183 for continuously driving, by means of a belt 184, the shaft 185. The shaft 185 is supported by suitable brackets 180 from the frame 182.

On the opposite side from the motor 183 the frame 182 is provided with grooves 186 in which bearing brackets 187 are adapted to be moved. Vertical shafts 188 are journaled in pairs of these brackets 187. There is also journaled in the two upper brackets 187 a horizontal shaft 189 which has mounted thereon a pulley or similar device 191 that is continuously rotated by a belt 192 from the shaft 185. Driving connections between the horizontal shaft 189 and the vertical shafts 188 are made by beveled gears 193 that may be moved upon the shaft 189 to correspond to the position of the vertical shafts. By means of the sliding brackets 187 and the bevel gears, the vertical shafts 188 may be adjusted to accommodate the production of various size tubes.

Mounted rotatably upon the shafts 188 are rubber covered rollers 194 which are driven by means of friction clutches 195 held in operative position by expansible springs 196 retained in caps 197. The rollers 194 are free to rotate around the shafts 188 and are supported by two collars. The compression of the springs 196 is so adjusted that the clutches 195 effect just sufficient friction that the rollers 194 rotate when the tube between them has been cut off from the rest of the tube. On the other hand, the friction controlled by the springs is not sufficient to turn these rollers when the tube lying between them has not yet been cut off. To prevent the rollers 194 from distorting the tube there are provided in the mandrel slides 198 carrying rollers 199. These slides 198 may be moved lengthwise the mandrel so that the rollers 199 will register with the rollers 194 which are moved with the frame 182 in adjusting the machine for the production of different length tubes. The mechanism just described maintains a slight but constant pull on the tube.

Mounted for free movement on the shaft 185 is a housing 201 having extending therefrom an arm 202 in the outer end of which is a stud 203. On the stud 203 is a roller holder 204 carrying a shaft 205 in a forked end 206 thereof and a stud 207 in the opposite end. The stud 207 is attached to a spring 208 which is also attached to a part of the bracket 180. On the shaft 205 is a rubber covered roller 209 and a pulley 211. The pulley 211, and through it shaft 205, is driven by means of a belt 212 from the shaft 185. The roller 209 is driven from the shaft 205 by means of a friction clutch 213 similar to clutches 195.

The stud 203 is attached at one end to a connecting rod 214 having collars 215 for the purpose of adjusting the length of same. This connecting rod is fastened at its other end to a crank 216 mounted in a bracket bearing 217. The other arm of the crank 216 is attached to a connecting rod 218 which is in turn connected to a crank 219 non-rotatably mounted upon a horizontal shaft 221 that extends across the end of the machine. The shaft 221 is rocked back and forth by a solenoid 222 by means of a crank 223 connected to the piston 224 of the solenoid. The solenoid is supported upon the frame 182 by a suitable bracket 225. The shaft 221 is equipped with a crank 226 having a stud 227 that is attached to a spring 228, the other end of which spring is attached by a stud 229 to the frame 182. The spring operates against the pull of the solenoid 222 to rotate the shaft 221 when the solenoid is de-energized.

The shaft 221 is supported on the frame 182 by suitable bracket bearings 231. The shaft 221 has mounted thereon two cams 232 which upon rotation of the shaft push the cam followers 233 forward. The cam followers 233 are studs mounted on the ends of cranks 234. Vertical shafts 235 are attached to the cranks 234 and extend upwardly one on each side of the mandrel 54. These shafts 235 are held in place by brackets 236 that are slidably mounted in tracks 237 extending from the frame 182. By means of the tracks 237 and the shape of the cams 232 the shafts may be spread apart any suitable distance to accommodate the production of various size tubes.

A pin 238 is attached to the shaft 235 and a spring 239 is attached at one end to the pin and at its other end to a stud 241 on the bracket 236. The spring operates to rotate the shaft in a direction that will hold the cam follower 233 against the cam 232.

A collar 242 is attached to the shaft 235. This collar has a projecting portion formed into a fork that fits about a pin 243 carried in a groove 244 of a block 245. The block 245 is supported by the projection on the collar 242 and a pin 246 in the bracket 236. Upon rotation of the shafts 235 the blocks are reciprocated toward and away from the end of the mandrel 54. These blocks 245 function as gates against which the advancing tube abuts and is held until the brakes 117 and 118 of the advancing stage have gripped the tube 8.

Mounted on the frame 182 is a saddle 247. Riding in the saddle is a block 248 that may be vertically adjusted for different size tubes by the turn screw 249. On the block 248 is a standard 251 that may be adjusted with respect to the block by means of a turn screw 252, such that the standard 251 may be adjusted to form tubes of different length. The standard 251 is provided with two fulcrum shafts 253 on each of which is mounted a link 254 held in an upward position by a small spring 255. The links 254 support in a movable manner a rod 256 that operates a micro-switch 257. The rod 256 terminates in a finger 258 that tends to project into a groove 259 in the end of the mandrel 54.

The control of the entire machine starts at the micro-switch 257 which is operated by the advancing tube depressing the finger 258. Both the lever arrangement 256 and the switch are very sensitive so that the slightest touch at the tip of the finger 258 will break the current. When the tube advances towards the closed gates 245, at the moment it hits this finger tip it depresses it, thereby causing the micro-switch 257 to open. Then the machine goes through a series of timed operations until the tube is cut and ejected at which time the finger is brought back into the groove 259 where it remains until the next tube depresses it again.

Figure 15:
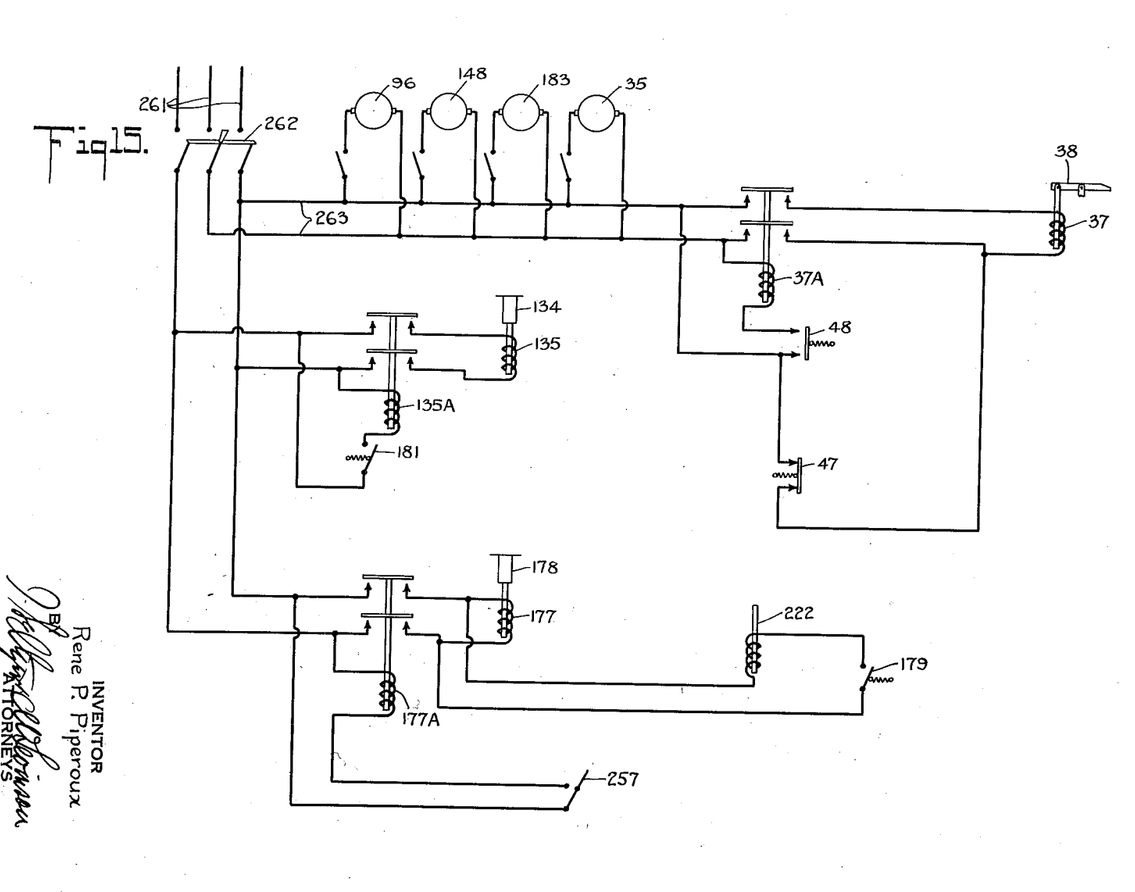
Fig. 15 is a wiring diagram for the machine.

Fig. 15 represents the electrical hook-up of the machine. From a three phase source of power 261 with master switch 262 a two phase circuit 263 is taken off. In this circuit is connected in parallel the four driving motors; 96 being the variable speed motor driving the concave rollers 112 of the advancing stage; 148 being the constant speed motor driving the cutter sleeve 143 of the cutting stage; 183 being the constant speed motor driving the rubber covered rollers 194 of the ejection stage; and 35 being the variable speed motor driving the pinch rollers 29 of the feeding stage. These four motors run continuously as soon as their individual switches are closed. The solenoid 37 that operates clutch lever 38 is controlled by relay 37A which in turn depends upon the switches 48 and 47. These switches are operated by the floating roller 46 which slides up and down its guides in the feeding stage part of the machine. The switch 47 is normally closed while switch 48 is normally open. When the floating roller 46 is in its top position it closes the switch 48 and thus the relay 37A, thereby energizing the solenoid 37 which in turn engages the clutch 38 and permits the flat stock to be fed out. When the floating roller slides down, the switch 48 opens, with the aid of a spring but the solenoid 37 remains energized because switch 47 is still closed. When, however, the floating roller reaches the switch 47 the circuit is broken and the feeding of the stock stops.

At the bottom of the diagram is the micro-switch 257 which is operated by finger 258 as explained above. When the tube hits this finger thereby closing the switch the coil of the relay 177A is energized, thus effecting a circuit through solenoid 177 which operates the air valve 178 which turns the cutter controlling plug 161 by means of the lever 167. As the lever 167 is moved by the solenoid 177 it first closes the switch 179 and then opens the switch 181.

When the lever 167 closes the switch 179, the solenoid 222 is energized. The solenoid operates the gates 245 and the upper ejecting roller 209. At a slightly later time the lever 167 opens the switch 181, de-energizing the solenoid 135A opening the circuit to solenoid 135 which operates the air valve 134 which in turn brings the rollers 112 to the tube advancing position.

In operation the tube is fed out along the mandrel with the aid of rollers 112 until it hits the gates 245 and the finger 257 almost simultaneously, the air cylinder actuating the cutter head moves the latter into the cutting position. Almost at the same time the gates 245 are opened and roller 209 brought against the tube, thus ejecting the severed portion. As soon as that happens, or rather during the time of its happening, the switch 181 has been opened, thereby bringing the advancing rollers 112 to the mandrel and releasing the brakes 117 and 118 to feed out the stock up to the gates.

Although an electrical hook-up has been shown in the drawings and described above for the purpose of illustrating a preferred mode of carrying out my invention, mechanical means such as connecting leverage systems and operating cams and pneumatic or hydraulic cylinders may be used to obtain similar results or a combination of such mechanical and electrical means may be employed.

It is to be understood that the foregoing detailed description is merely given by way of illustration and that many variations may be made therein without departing from the spirit of my invention.

Having described my invention, what I desire to secure by Letters Patent is:

1. A device for making tubes or cylinders from flat stock material comprising, a support for the material in the form of a roll of flat stock, means for feeding the flat stock under substantially constant tension from the said roll, means for forming the tube, means for cementing the tube, means for advancing the tube as it is formed, a plurality of supporting means spaced apart from each other and from said forming and advancing means and adapted, in conjunction with said forming and advancing means, to constitute the sole support for the material during its travel through the device, means for cutting the tube into predetermined lengths, means for ejecting the length of tube after it is cut off, means permitting timing of the different parts and means for adjusting the different parts so as to produce tubes of different sizes and lengths.

2. A device for making tubes or cylinders from flat stock comprising a support for a roll of flat stock, means for feeding the flat stock under constant tension from the parent roll, a mandrel about which the tube is formed, means for forming the tube, means for cementing the tube, means for advancing the tube as it is formed, means for cutting the tube into predetermined lengths, means for ejecting the length of tube after it is cut off, electrical means permitting timing of the different parts and means for adjusting the different parts to the production of tubes of different sizes and lengths.

3. A device for making tubes or cylinders from flat stock comprising a support for a roll of flat stock, means for feeding the flat stock under constant tension from the parent roll including a floating roller, pinch rollers, and means governed by the floating roller for controlling the pinch rollers, a mandrel about which the tube is formed, means for forming the tube, means for cementing the tube, means for advancing the tube as it is formed, means for cutting the tube into predetermined lengths and means for ejecting the length of tube after it is cut off.

4. A device for making tubes or cylinders from flat stock comprising a support for a roll of flat stock, means for feeding the flat stock under constant tension from the parent roll, a mandrel about which the tube is formed, means for forming the tube, means for cementing the tube, means for advancing the tube as it is formed including advancing rollers, brakes and means to make either the said rollers or said brakes to actively engage the tube, means for cutting the tube into predetermined lengths, means for ejecting the length of tube after it is cut off, electrical means permitting timing of the different parts and means for adjusting the different parts to the production of tubes of different sizes and lengths.

5. A device for making tubes or cylinders from flat stock comprising a support for a roll of flat stock, means for feeding the flat stock under constant tension from the parent roll, a mandrel about which the tube is formed, means for forming the tube including a plurality of rollers forming a shaping ring and crowding rollers, means for cementing the tube, means for advancing the tube as it is formed, means for cutting the tube into predetermined lengths, means for ejecting the length of tube after it is cut off, electrical means permitting timing of the different parts and means for adjusting the different parts to the production of tubes of different sizes and lengths.

6. A device for making tubes or cylinders from flat stock comprising a support for a roll of flat stock, means for feeding the flat stock under constant tension from the parent roll, a mandrel about which the tube is formed, means for forming the tube including a plurality of rollers forming a shaping ring, crowding rollers and a pressing roller to press together the cemented portion of the tube, means for cementing the tube, means for advancing the tube as it is formed, means for cutting the tube into predetermined lengths, means for ejecting the length of tube after it is cut off, electrical means permitting timing of the different parts and means for adjusting the different parts to the production of tubes of different sizes and lengths.

7. A device for making tubes or cylinders from flat stock comprising a support for a roll of flat stock, means for feeding the flat stock under constant tension from the parent roll, a mandrel about which the tube is formed, means for forming the tube, means for cementing the tube, means for advancing the tube as it is formed, means for cutting the tube into predetermined lengths including a rotatable sleeve, a disc type knife in said sleeve and a cam operable to move the knife toward and away from the mandrel, means for ejecting the length of tube after it is cut off, electrical means permitting timing of the different parts and means for adjusting the different parts to the production of tubes of different sizes and lengths.

8. A device for making tubes or cylinders from flat stock comprising a support for a roll of flat stock, means for feeding the flat stock under constant tension from the parent roll, a mandrel about which the tube is formed, means for forming the tube, means for cementing the tube, means for advancing the tube as it is formed, means for cutting the tube into predetermined lengths including a rotatable sleeve, a disc type knife in said sleeve, a plug having a cam face operable to move the knife toward and away from the mandrel and means for rotating the plug, means for ejecting the length of tube after it is cut off, electrical means permitting timing of the different parts and means for adjusting the different parts to the production of tubes of different sizes and lengths.

9. A device for making tubes or cylinders from flat stock comprising a support for a roll of flat stock, means for feeding the flat stock under constant tension from the parent roll, a mandrel about which the tube is formed, means for forming the tube, means for cementing the tube, means for advancing the tube as it is formed, means for cutting the tube into predetermined lengths, means for ejecting the length of tube after it is cut off including a depressable finger for controlling the cutting means, electrical means permitting timing of the different parts and means for adjusting the different parts to the production of tubes of different sizes and lengths.

10. A device for making tubes or cylinders from flat stock comprising a support for a roll of flat stock, means for feeding the flat stock under constant tension from the parent roll, a mandrel about which the tube is formed, means for forming the tube, means for cementing the tube, means for advancing the tube as it is formed, means for cutting the tube into predetermined lengths, means for ejecting the length of tube after it is cut off including gates movable into and out of the path of the tube, electrical means permitting timing of the different parts and means for adjusting the different parts to the production of tubes of different sizes and lengths.

11. A device for making tubes or cylinders from flat stock comprising a support for a roll of flat stock, means for feeding the flat stock under constant tension from the parent roll, a mandrel about which the tube is formed, means for forming the tube, means for cementing the tube, means for advancing the tube as it is formed, means for cutting the tube into predetermined lengths, means for ejecting the length of tube after it is cut off including gates movable into and out of the path of the tube and a depressible finger for controlling the gates and cutting means, electrical means permitting timing of the different parts and means for adjusting the different parts to the production of tubes of different sizes and lengths.

12. A device for making tubes or cylinders from flat stock comprising a support for a roll of flat stock, means for feeding the flat stock under constant tension from the parent roll, a mandrel about which the tube is formed, means for forming the tube, means for cementing the tube, means for advancing the tube as it is formed, means for cutting the tube into predetermined lengths, means for ejecting the length of tube after it is cut off including a driven roller adapted to contact the severed length of tube and move free of an advancing tube, electrical means permitting timing of the different parts and means for adjusting the different parts to the production of tubes of different sizes and lengths.

13. A device for making tubes or cylinders from flat stock comprising a support for a roll of flat stock, means for feeding the flat stock under constant tension from the parent roll, a mandrel about which the tube is formed, means for forming the tube, means for cementing the tube, means for advancing the tube as it is formed, means for cutting the tube into predetermined lengths, means for ejecting the length of tube after it is cut off including a pair of rollers, friction clutches for driving said rollers, a third roller, a friction clutch for driving said third roller and means for moving said third roller into engagement with a severed length of tube and free of an advancing unsevered tube, electrical means permitting timing of the different parts and means for adjusting the different parts to the production of tubes of different sizes and lengths.

14. A device for making tubes or cylinders from flat stock comprising a support for a roll of flat stock, means for feeding the flat stock under constant tension from the parent roll, a mandrel about which the tube is formed, means for forming the tube, means for cementing the tube, means for advancing the tube as it is formed, means for cutting the tube into predetermined lengths, means for ejecting the length of tube after it is cut off including a pair of rollers, friction clutches for driving said rollers, a third roller, a friction clutch for driving said third roller, means for moving said third roller into engagement with a severed length of tube and free of an advancing unsevered tube and means for adjusting all of said rollers to accommodate different sized tubes.

15. A device for making tubes or cylinders from flat stock comprising a support for a roll of flat stock, means for feeding the flat stock under constant tension from the parent roll, a mandrel about which the tube is formed, means for forming the tube including a ring of rollers for partially shaping the flat stock, a second ring of rollers for more completely shaping the flat stock, crowding rollers for completing the shaping of the flat stock and a pressing roller for pressing together the freshly cemented portion of the tube, means for cementing the tube, means for advancing the tube as it is formed, means for cutting the tube into predetermined lengths, means for ejecting the length of tube after it is cut off, electrical means permitting timing of the different parts and means for adjusting the different parts to the production of tubes of different sizes and lengths.

16. A device for making tubes or cylinders from flat stock comprising a support for a roll of flat stock, means for feeding the flat stock under constant tension from the parent roll, a mandrel about which the tube is formed having rings of velvet at spaced points for supporting the tube means for forming the tube, means for cementing the tube, means for advancing the tube as it is formed, means for cutting the tube into predetermined lengths, means for ejecting the length of tube after it is cut off, electrical means permitting timing of the different parts and means for adjusting the different parts to the production of tubes of different sizes and lengths.

17. A device for making tubes or cylinders from flat stock comprising a support for a roll of flat stock, means for feeding the flat stock under constant tension from the parent roll, a mandrel about which the tube is formed, said mandrel having rollers mounted therein in registry with an advancing means and rollers adjustably mounted therein in registry with an ejecting means, means for forming the tube, means for cementing the tube, means for advancing the tube as it is formed, means for cutting the tube into predetermined lengths, means for ejecting the length of tube after it is cut off, electrical means permitting timing of the different parts and means for adjusting the different parts to the production of tubes of different sizes and lengths.

18. A device for making tubes or cylinders from flat stock comprising a support for a roll of flat stock, means for feeding the flat stock under constant tension from the parent roll, a mandrel about which the tube is formed, means for forming the tube, means for cementing the tube including a block having a groove along which the cement is adapted to flow by gravity and a well in said groove adapted to lie adjacent an edge of the flat stock as it is being formed to a tube, means for advancing the tube as it is formed, means for cutting the tube into predetermined lengths, means for ejecting the length of tube after it is cut off, electrical means permitting timing of the different parts and means for adjusting the different parts to the production of tubes of different sizes and lengths.

19. A device for making tubes or cylinders from flat stock comprising a support for a roll of flat stock, means for feeding the flat stock under constant tension from the parent roll, a mandrel about which the tube is formed, means for forming the tube, means for cementing the tube, means for advancing the tube as it is formed including continuously rotating advancing rollers on each side of the mandrel, a housing on each side of the mandrel for supporting the advancing rollers on that side, a brake on each side of the mandrel supported by the housing on the opposite side of the mandrel and cams adapted to move the housings apart, means for cutting the tube into predetermined lengths, means for ejecting the length of tube after it is cut off, electrical means permitting timing of the different parts and means for adjusting the different parts to the production of tubes of different sizes and lengths.

20. A device for making tubes or cylinders from flat stock comprising a support for a roll of flat stock, means for feeding the flat stock under constant tension from the parent roll, a mandrel about which the tube is formed, means for forming the tube, means for cementing the tube, means for advancing the tube as it is formed including continuously rotating advancing rollers on each side of the mandrel, a housing on each side of the mandrel for supporting the advancing rollers on that side, a brake on each side of the mandrel supported by the housing on the opposite side of the mandrel, cylindrical shaped cams for moving the housings apart and means to rotate the same, means for cutting the tube into predetermined lengths, means for ejecting the length of tube after it is cut off, electrical means permitting timing of the different parts and means for adjusting the different parts to the production of tubes of different sizes and lengths.

RENE P. PIPEROUX.